US012794837B2

(12) United States Patent
Blum et al.

(10) Patent No.: US 12,794,837 B2
(45) **Date of Patent: *Nov. 10, 2026**

(54) VIRTUAL SPACE PLATFORM FOR DISTRIBUTION OF MESSAGES VIA MULTIPLE CHANNELS

(71) Applicant: PubNub, Inc., San Francisco, CA (US)

(72) Inventors: Stephen L. Blum, San Francisco, CA (US); Vincent W. Nalbone, San Francisco, CA (US); Hiren Adesara, Frisco, TX (US); Jeffrey Ronald Moore, San Francisco, CA (US)

(73) Assignee: PubNub, Inc., San Francisco, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 19/028,493

(22) Filed: Jan. 17, 2025

(65) Prior Publication Data

US 2025/0168137 A1 May 22, 2025

Related U.S. Application Data

(63) Continuation of application No. 18/356,312, filed on Jul. 21, 2023, now Pat. No. 12,244,550.

(60) Provisional application No. 63/369,022, filed on Jul. 21, 2022.

(51) Int. Cl.
*H04L 51/046* (2022.01)
*G06T 17/00* (2006.01)
*H04L 51/216* (2022.01)

(52) U.S. Cl.
CPC ............ *H04L 51/046* (2013.01); *G06T 17/00* (2013.01); *H04L 51/216* (2022.05)

(58) Field of Classification Search
CPC ................ H04L 51/046; H04L 51/216; H04L 51/214; G06T 17/00
USPC ........................................................ 709/224
See application file for complete search history.

(56) References Cited

U.S. PATENT DOCUMENTS

| | | | | |
|---|---|---|---|---|
| 7,587,517 | B2 | 9/2009 | Huang et al. | |
| 10,887,253 | B1 * | 1/2021 | Synytskyy | H04L 51/02 |
| 11,178,091 | B1 * | 11/2021 | Madhavan | H04L 49/9036 |
| 2014/0237053 | A1 | 8/2014 | Abhyanker | |
| 2018/0248977 | A1 * | 8/2018 | Leydon | H04L 67/63 |
| 2018/0270605 | A1 * | 9/2018 | Wang | H04W 72/04 |
| 2019/0332522 | A1 * | 10/2019 | Leydon | G06F 11/3696 |
| 2020/0059376 | A1 * | 2/2020 | Slovetskiy | H04L 12/1877 |
| 2022/0155992 | A1 * | 5/2022 | Nortman | G06F 3/0604 |
| 2022/0286415 | A1 * | 9/2022 | Cullen | H04L 45/00 |

(Continued)

OTHER PUBLICATIONS

Bernstein, C., IoT Agenda.com MQTT (MQ Telemetry Transport), https://www.techtarget.com/iotagenda/definition/MQTT-MQ-Telemetry-Transport?vgnextfmt=print, Jul. 7, 2023, 6 pages.

*Primary Examiner* — Karen C Tang
(74) *Attorney, Agent, or Firm* — Rothschild LLP

(57) ABSTRACT

Methods and systems for distributing messages to subscribers are described. When a processor of a communication platform receives a message, the processor will analyze the message and determine, based on one or more elements of the message, whether the message is of a publish type or a signal type. The processor will the use the message type to select a quality of service for delivery of the message. The processor will assign the message to the channel. The processor will then transmit the message to one or more subscribers to the channel according to the quality of service.

20 Claims, 7 Drawing Sheets

(56) References Cited

U.S. PATENT DOCUMENTS

| | | | | |
|---|---|---|---|---|
| 2022/0311729 | A1* | 9/2022 | Mistry | H04L 51/214 |
| 2023/0336510 | A1* | 10/2023 | Miller | H04L 51/212 |

* cited by examiner 402 403 404 405

401a

| User Properties | | Message Properties | | Channel | QoS |
|---|---|---|---|---|---|
| User Level | Churn Risk | Delivery Area | Food Type | Type of Processing | 1 |
| <any> | <any> | <any> | Pizza | Food-of-the-Month Processing | 1 |
| <any> | <any> | <any> | <any> | Regular Processing | 1 |
| | | | | | |

FIG. 4A 402 403 404 405

401b

| User Properties | | Message Properties | | Channel | QoS |
|---|---|---|---|---|---|
| User Level | Churn Risk | Delivery Area | Food Type | Type of Processing | 1 |
| <any> | <any> | <any> | Sushi | Food-of-the-Month Processing | 1 |
| <any> | <any> | <any> | <any> | Regular Processing | 1 |
| | | | | | |

FIG. 4B 402 403 404 405

401c

| User Properties | | Message Properties | | Channel | QoS |
|---|---|---|---|---|---|
| User Level | Churn Risk | Delivery Area | Food Type | Type of Processing | 1 |
| Gold | <any> | CA | <any> | VIP Processing | 1 |
| Platinum | <any> | <any> | <any> | VIP Processing | 1 |
| <any> | High | <any> | <any> | Churn Risk Processing | 1 |
| <any> | <any> | <any> | Sushi | Food-of-the-Month Processing | 1 |
| <any> | <any> | <any> | <any> | Regular Processing | 1 |

FIG. 4C

VIRTUAL SPACE PLATFORM FOR DISTRIBUTION OF MESSAGES VIA MULTIPLE CHANNELS

RELATED APPLICATIONS AND CLAIM OF PRIORITY

This patent document is a continuation of and claims priority to U.S. patent application Ser. No. 18/356,312, filed Jul. 21, 2023, which claims priority to U.S. provisional patent application No. 63/369,022, filed Jul. 21, 2022. The disclosure of each priority application is fully incorporated into this document by reference.

BACKGROUND

Many modern communication systems transmit sequences of messages from publishers to subscribers. Subscribers may be individuals who are using electronic devices to access electronic messaging services, video and audio streaming services, news feeds, conferencing services, and the like. Subscribers also may be electronic devices acting in accordance with programming instructions, such as components of a home automation system which may receive messages from other devices in an Internet-of-things arrangement.

To distribute messages from publishers to subscribers, most communication platforms use a topology of communication channels. This may require publishers, subscribers or both to know and select the channels on which they operate in order to communicate with each other. For example, subscribers may need to use a managed service, such as a message broker system, to manage channel subscriptions. In addition, third-party developers who use the platforms may need to provide their own server-side infrastructure to manage user-channel relationships and permissions.

Improved message delivery systems are needed to address the technical issues described above. This document describes methods and systems that are directed to addressing such issues.

SUMMARY

In various aspects, this document describes method, system, and computer program product embodiments for distributing messages from publishers to subscribers. The method includes, by a processor operating as a virtual space platform, receiving a plurality of messages from a plurality of publishers. For each of the messages: the method includes analyzing the message and determining, based on one or more elements of the message, identifying a virtual space and a channel within the virtual space platform to which the message is to be assigned. The platform will assign the message to the determined virtual space and channel, and it will transmit the message to one or more subscribers to the channel.

Optionally, for each of the messages, the method also may include analyzing the message to determine a message type, wherein candidate message types comprise "publish" and "signal". The method also may include, if the message is a publish type, the method may include saving the massage to a memory for later distribution to subscribers who are currently offline. Otherwise, if the message is not a publish type, the platform will not save the message to the memory and instead will delete or otherwise not retain the message after transmitting the message to the one or more subscribers.

Optionally, when assigning the message to the determined channel, if the message is of the publish type, the platform will assign the message to a publish channel. Alternatively, if the message is the signal type, the platform will assign the message to a signal channel.

Optionally, the platform may delete the virtual space after the occurrence of a specified event.

Various embodiments also include a message distribution system comprising a processor and a memory device that contains programming instructions configured to cause the processor to operate as a virtual space platform by implementing any of the method variations described above. Other embodiments include a computer program product comprising a memory device containing such programming instructions.

BRIEF DESCRIPTION OF THE DRAWINGS

FIGS. 4A-4C illustrate examples of a decision table that the system may use to route messages to various channels, and how a user may assign or modify parameters of the decision table.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

Additional terms that are relevant to this disclosure will be defined at the end of this Detailed Description section.

Figure 1:
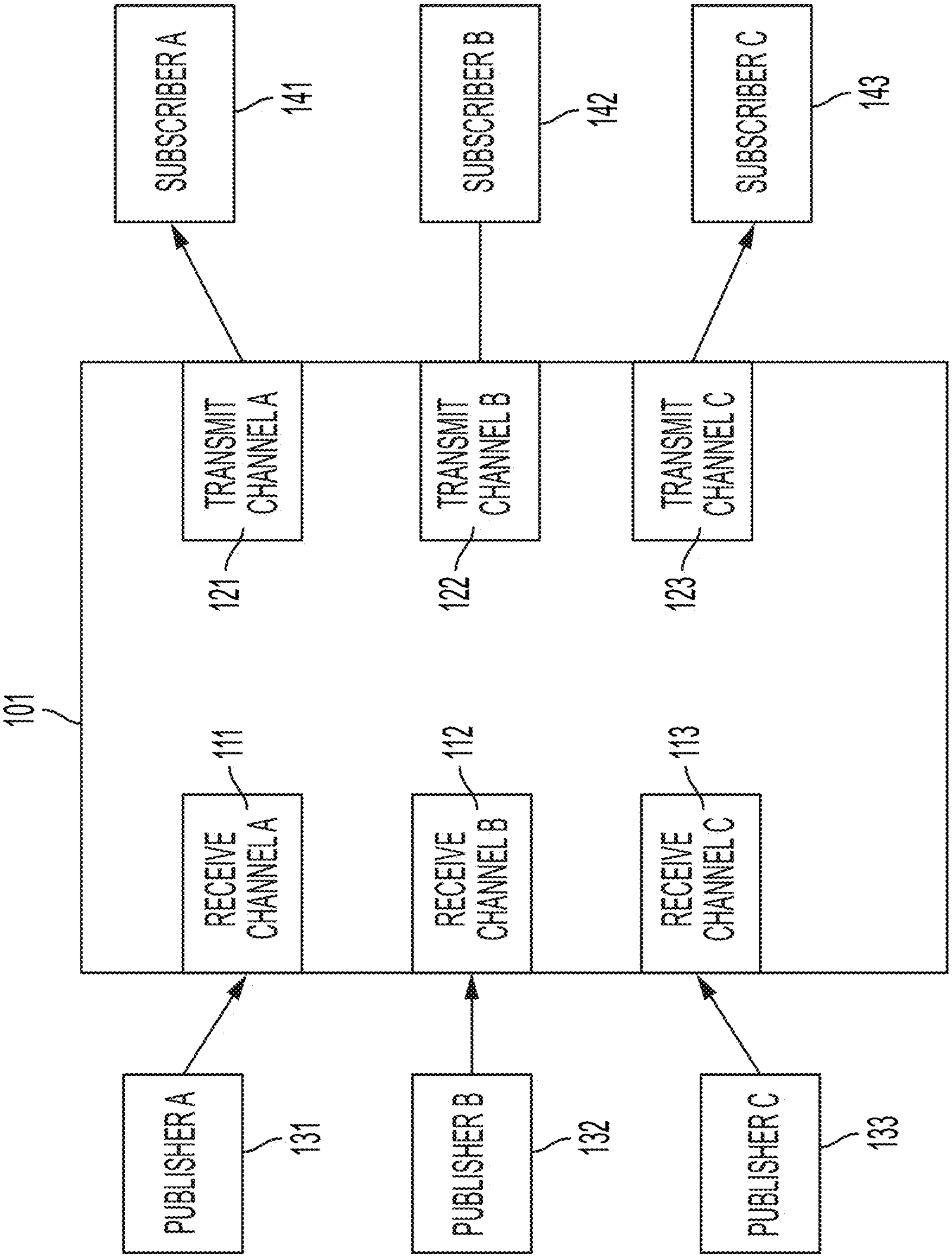
FIG. 1 illustrates example components of a communication system for distributing messages from publishers to subscribers among multiple channels.

FIG. 1 depicts one or more embodiments of various components of a system to pass data among multiple electronic devices, and which may be used to accomplish the embodiments described below. The system includes a communication platform 101 that is accessible to remote client electronic devices via one or more communication networks. The communication platform 101 will include at least one computing device. The communication platform 101 may be communicatively connected to a network to which the client devices are also connected (as in an Internet-of-things arrangement). Alternatively, the communication platform 101 may be remotely located and in communication with the client devices via one or more wireless communication networks, as with a video or audio streaming service, a conferencing service, or the like.

The client devices include any number of publishers 131-133, which are client devices from which the communication platform 101 receives messages for distribution to subscribers. The client devices also include any number of subscribers 141-143, which are client devices that receive messages that the network distributes. The term "publisher" refers to a device or system that directly or indirectly sends messages to the system. The term "subscriber" generally refers to a device or system that is receiving messages from the system. The publish/subscribe (or "pub/sub") paradigm is a known method of real-time messaging. Using the pub/sub pattern, publishers (sources of data) push messages out to any number of subscribers (receivers of data) that have subscribed to their topics. In this document, the term "user", when used to identify a user of the system, is intended to include either a publisher or a subscriber. In the present embodiment, a "subscriber" is also a client that is a member of the platform, and that is actively present on (i.e., communicatively connected to) the platform so that the subscriber may receive messages via the platform.

The communication platform 101 also manages the distribution of multiple channels of messages. A channel is a data stream of messages associated with a particular topic, and which is separately identifiable from other channels. A topic has an active channel if there is at least one subscriber is currently mapped to the channel. The topic may be a named destination (such as a subscriber node or other data stream), a named publisher, or some other parameter that distinguishes the channel from other channels. Optionally, a topic may include multiple parameters, such as if a particular publisher distributes messages on multiple channels, in which case the topic of each channel for that publisher may identify the publisher and include at least one other parameter. In some embodiments, a channel may be in the form of a metadata included in messages, in which the metadata identifies the message as being affiliated with a particular topic. In some embodiments, a channel corresponds to a physical device, such as an I/O port, radio frequency tuner setting, a port associated with an Internet Protocol (IP) address, a specific fiber optic or electronic communication path, a specific sending or receiving device, and/or the like. A channel also may be associated with subscriber attributes, such as subscribers who have purchased a premium level of access to certain content. Therefore, a channel may be characterized by virtual attributes, physical attributes, or both.

By way of example, FIG. 1 shows that the communication platform is configured to receive messages and associate each of the messages with a particular channel. For example, in the very simple example shown, upon receipt of messages from Publisher A 131, the platform 101 assigns those messages to Channel A 111. The platform 101 may then transmit the Channel A messages 121 to subscribers of Channel A (such as Subscriber A 141). Similarly, platform 101 may receive messages from Publisher B 132, assign those messages to Channel B 112, and transmit the Channel B messages 122 to Subscriber B 142. Platform 101 also may receive messages from Publisher C 133, assign those messages to Channel C 113, and transmit the Channel C messages 123 to Subscriber C 143.

When a publisher publishes a message to the platform, the publisher is effectively asking the platform to deliver that message to all relevant channels to which clients who meet designated criteria are subscribed. A message is considered published to a channel when the message is assigned metadata that characterizes the massage as being part of that channel. This action may be done by the publisher, by the platform, or in part by each. The metadata may be a part of the message that includes a channel name for the channel. The platform may limit each message to a single channel, or it may permit a message to be assigned to more than one channel.

A subscriber device can be mapped to one or more channels, such that messages assigned to all channels to which the subscriber device is mapped are delivered to the subscriber device. For example, in the context of a distributed gaming system, the system may map a subscriber to multiple player channels, including his/her own channel and the channel(s) of other player(s). Any number of subscribers may be subscribed to a channel that publishes messages. In addition, if a channel's topic is not limited to a publisher, any number of publishers may be mapped to a single channel. Also, as noted above, a single publisher may publish messages to multiple channels. Accordingly, the one-to-one relationship of publishers, subscribers and channels shown in FIG. 1 for simplicity, for illustration purposes only, and is not required or intended to limit the scope of the invention.

A subscriber client may connect to a channel (via a subscriber node) using any now or hereafter known protocol. For example, the platform's subscriber nodes may allow long-lived connections such as long-polling, COMET, WebSockets, SPDY, BOSH, or other techniques. However, unlike prior systems the subscriber need not select the particular channel to which it desires to connect. Instead, when a member of the platform is present on the platform, the system automatically maps the member to one or more channels containing messages that are relevant to the member, thus dynamically making the member a subscriber to those channels.

The platform 101 may use any of various rules to assign messages to channels. For example, the platform 101 may assign to a particular channel (e.g., Channel A 111) all messages received from a particular address or publisher (e.g., Publisher A 131). Or, the data center may assign a message to a channel by parsing the message's header, or metadata associated with the message, to look for one or more keywords or character strings that relate to a particular channel. Additional message/channel association processes are disclosed in U.S. Pat. No. 9,955,444 to Blum et al., the disclosure of which is fully incorporated into this document by reference.

When the platform 101 transmits messages to clients that are subscribers 141, 142, 143 or to one or more data services, the transmission may occur via one or more of the transmit channels 121, 122, 123. Then, when the platform 101 receives updated message objects and the updates correspond to any of the channels to which a subscriber is mapped, the system may deliver the updates via the same channel so that subscriber may receive updates and have the latest data that was published to the subscriber's channels. Alternatively, the system may publish the updates to a different channel and dynamically map the member to that different channel, thus making the member a subscriber to that channel.

Although FIG. 1 illustrates the platform as a single device or system, in various embodiments the platform may be distributed among multiple data centers. Different publishers may direct messages to different data centers of the platform, different subscribers may receive the messages from different data centers, and the messages may be replicated among multiple geographically distributed data centers. Example systems and methods for implementing such an arrangement are disclosed in U.S. Pat. No. 11,323,538 to Blum et al., the disclosure of which is fully incorporated into this document by reference.

To facilitate the discussion of the present methods and systems for operating communication platform 101 as a virtual place platform, we now describe several concepts and terms.

Events. Client devices may include messaging applications that communicate with the platform 101 via an application programming interface (API). When a client makes a request to the platform's API, the platform will generate one or more events. Events reflect a change of state of the system from a previous point in time, such as a message received event (indicating that the platform received a message from a publisher), a message sent event (indicating that the platform transmitted a message to one or more subscribers), a message retrieved event (indicating that the platform received confirmation from a subscriber indicating that the subscriber received the message), or a typing indicator event (indicating that a publisher it creating a message but has not yet sent the message to the platform for transmission).

Messages. A message is data that is published, or transported, through the messaging platform. A message includes a header (such as metadata) and a payload (i.e., the information that the sender intends to convey to a recipient by the message). Messages are the basic component of communication through the platform. In some embodiments, the system may employ a messaging API that allows client devices to send, retrieve, modify, and delete messages. The platform may record each such action as an event, as noted above.

Message Type. Not all messages have the same meaning, and not all messages should be distributed in the same way. For example, some messages may be designated as "Publish", while others may be designated as "Signal". "Publish" messages contain content that is to be published to subscribers. "Publish" messages may be stored by the system for some period of time so that subscribers who are offline may access them when they reconnect to the platform. "Signal" messages are limited to a small size and are not persisted in storage. "Signal" messages typically do not contain content for publication but instead contain an indicator of status. For example, a "typing indicator" event may trigger a signal message telling a subscriber that a publisher is currently typing. Such a message may be less relevant to the subscriber, or it may be assigned to a different channel, than the publish message that includes the actual content from the publisher. Similarly, a "location of driver" indicator in a food delivery application may be considered to be a signal and assigned to a different channel than an "order received" or "estimated delivery time" message, as the "location of driver" signal will dynamically change and will become irrelevant after only a short period of time. In addition, "signal" messages may have a lower priority in that the system may not deliver all signal messages to a particular subscriber, and it may not monitor try to rectify any missed signal message deliveries. However, the system will seek to deliver all publish messages to the subscriber within certain constraints, or at least attempt to do so.

While "publish" and "signal" messages may be assigned to different channels, from the user's standpoint the platform will make message delivery seamless, so that the user does not need to select a particular channel to receive both publish messages and messages. In fact, the user may not even know the channel to which the message is assigned or to which the user is mapped. A member of the platform may send and/or receive both types of messages without choosing the channel of delivery.

Virtual Space. A virtual space is a collection of multiple channels. A virtual space platform is therefore a communication system that receives and distributes messages among multiple channels. The messages sent over different channels may have different purposes, different meanings, and/or different levels of importance. For example, a Group Chat Space may include messages of message type=Group Chat Message, along with messages of message type=Typing Indicator.

The platform may host and manage any number of virtual spaces. Some spaces may have a defined lifespan, and therefore may be deleted after a certain time has passed or event has occurred. Examples of short-lived virtual spaces may include those associated with a livestreamed concert or theater event, a multi-player game, or a virtual conference. Some virtual spaces may have sub-spaces (such as a "pre-show" or "waiting room" space before a virtual event happens). Optionally, some or all elements of short-lived virtual spaces may be archived after the event or a time period for non-interactive viewing. Other virtual spaces may persist until actively ended or deleted by a human operator or external service.

Figure 2:
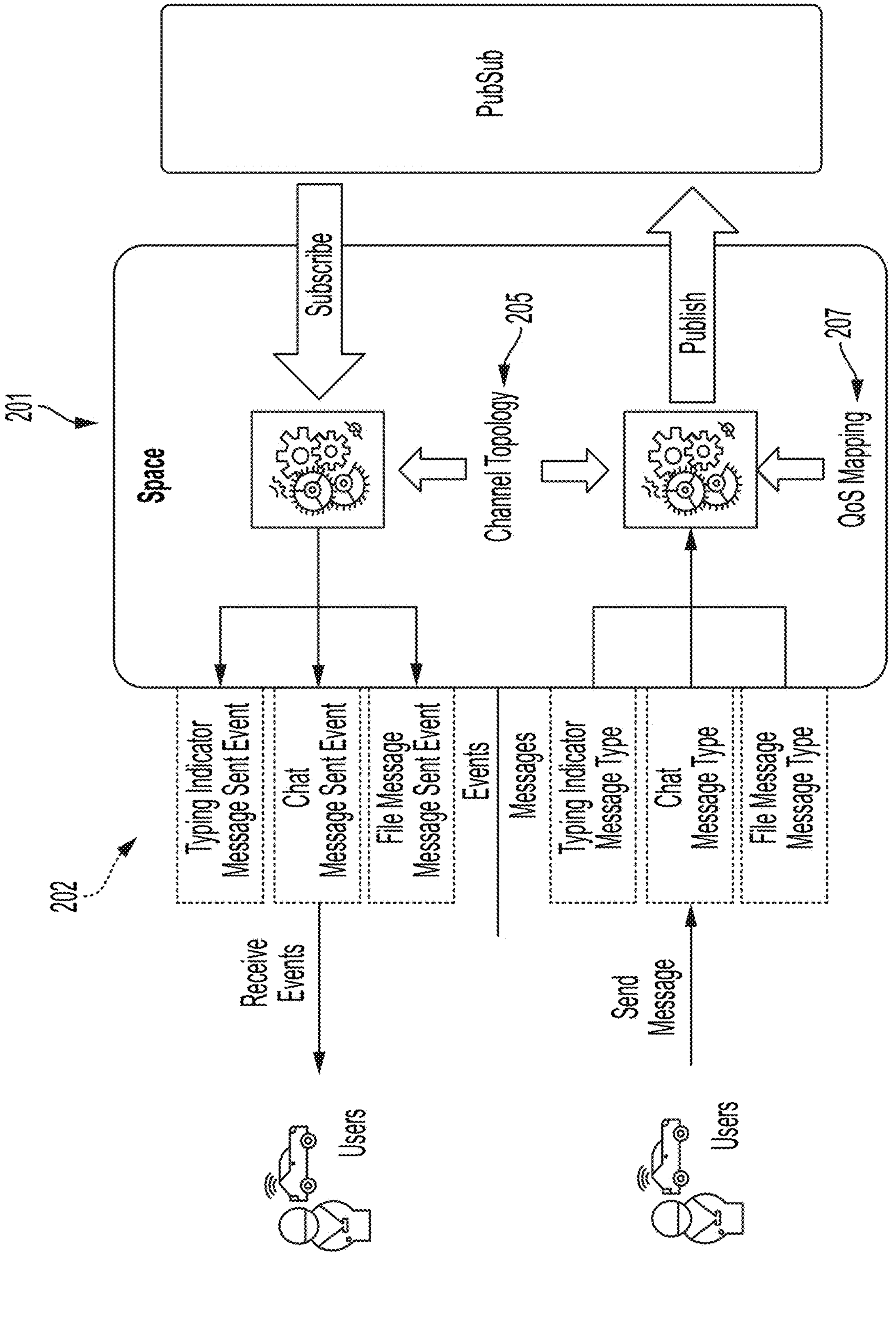
FIG. 2 illustrates example elements of a virtual space template.

To allow the creation of virtual spaces, the platform may establish and maintain any number of Space Templates. For example, with reference to the virtual space elements shown in FIG. 2, a Space Template is a template that enables a user to define a new virtual space 201, the message types 202 and event types 203 that the new space will support, channel topology 205 and quality-of-service 207 mappings, supported roles, and permission mappings to message types. These processes will be described in more detail in the discussion of FIG. 3 below.

Figure 3:
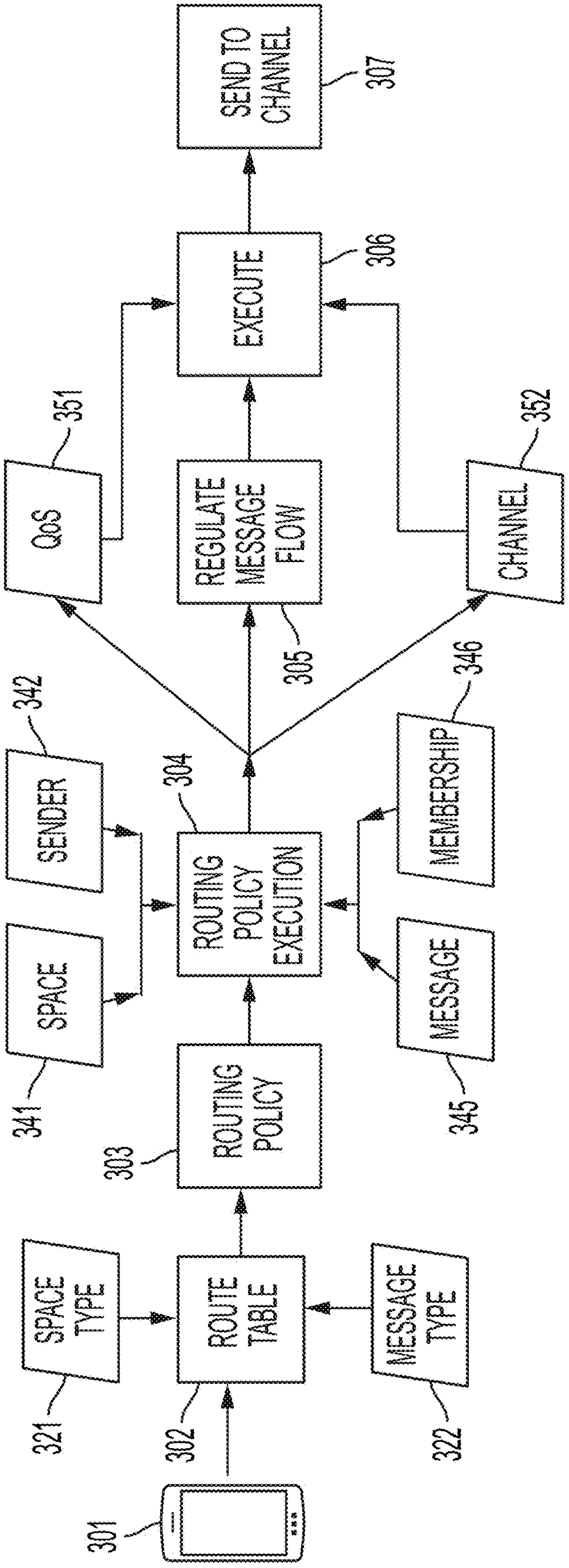
FIG. 3 illustrates a workflow by which the system may route messages to one or more channels.

In prior systems, when publishing a message to a channel, the publisher must identify the channel when sending the message. However, in the virtual space communication platform of the present invention, a publisher 231 may simply send a message 232 to the platform. The platform will examine the message and determine whether the message is of a particular type (e.g., publish vs. signal). The system also may identify the channel to which the message will be posted. Similarly, to receive messages, a subscriber 241 need only identify the events 203 or message types 202 that it wants to receive, and the virtual space will use the channel topology to make a Subscribe call against the appropriate channel and deliver the relevant messages 242 to the subscriber FIG. 3 illustrates the process by which a publisher may send a message on the platform, and by which the publisher will determine the channel or channels to which it will publish the message. At 301 a publisher device will provide a message to the platform. The system may offer the publisher access to the platform via a space-based API or other interface via which the publisher may provide messages and other information to the platform. The message will include message content, a message type, a UserID of the sender (i.e, the publisher), and optionally other information such as a SpaceID that identifies the space through which the message will be routed. The publisher and/or the platform also may identify one or more rules for routing its messages, and the system may store those policies to a decision table data structure referred to in this document as a route table 302. For example, the route table 302 may indicate that message types 322 (i.e., publish messages) should be distinguished from each other in terms of priority and channel. The route table 302 also may define quality of service (QOS) rules for different message types. For example, the QOS rules may require that a publish message be held for at least 48 hours with reattempts at delivery if not immediately delivered, while a signal message may be deleted after the first attempt at delivery regardless of whether the delivery actually occurs. A simple example of a route table is shown and described below in the context of FIGS. 4A-4C.

At 303 the system then applies the rules of the route table 302 via a route policy by assembling the rules that apply to the known characteristics of the message. At 304 the system executes the route policy to select one or more channels 352 to which the message will be sent, along with a quality of service 351 for the message. Routing policy execution at 304 may consider factors such as message content or type 345, membership of various subscribers 346 (which will be described in more detail below), the defined space 341 and the identity of the sender 342.

At 305 the system regulates the message flow to the channel or channels 352 according to the determined QoS 351. Regulation could include determining the rate at which messages are sent to a channel, whether to change the channel for delivery from the initially selected channel to a different channel, or even whether or not to send the message at all. For example, if at 305 the flow regulator determines that the message flow on a channel is high and/or messages are awaiting delivery on a channel, the system flow regulator may select a different channel and map the message's subscribers to that different channel that has relatively more bandwidth presently available. As another example, if a publisher or subscriber wants to slow the rate of delivery of messages, at 305 the flow regulator may add a delivery delay to a message and hold the message before sending it to a channel. As another example, if a publisher or subscriber wants to reduce the amount of messages delivered, at 305 the flow regulator may periodically drop one or more message and not deliver the dropped messages at all.

At 306 the system will execute delivery of the message via the routing policy and subject to any conditions that the flow regulator may have imposed. The message is then sent to the selected channel(s) at 307 for delivery to the subscribers who are mapped to that channel.

FIGS. 4A-4C illustrate an example decision table structure 401*a*-401*c* that the system will use to assign messages to channels. These figures also provide an illustration of how a user interface of the system may receive definitions to, or modifications, the decision table structure. In FIG. 4A, the table 401*a* identifies user properties 402 and message properties 403 that correspond to a particular channel 404. When (a) a message arrives from a user who is a publisher having properties 402 corresponding to those listed in a particular row of the table and (b) the message exhibits properties 403 listed in that row, then the system will map the message to the channel 404 listed in that row. Similarly, if (a) a subscriber has user properties 402 corresponding to those listed in a particular row of the table and (b) a message for the user exhibits properties 403 listed in that row, then the system will map the subscriber to the channel 404 listed in that row. When delivering the message across the channel 404 listed in the row, the system may do so according to the listed quality of service 405 for that row.

In FIG. 4A the decision table is largely empty, listing channels but not yet listing message properties or user properties other than the fact that messages seeking delivery of Pizza (and thus having a food type=pizza message property) should be assigned to a food-of-the-month processing channel. In FIG. 4B, a member or other user uses a user interface to update the food type message property 403 for the food-of-the month channel to be sushi, so that after the user makes the change messages seeking delivery of sushi, rather than delivery of pizza, are then mapped to the channel. This allows a user to update rules for message delivery via a user interface simply by changing a parameter and updating the table structure 401*b*, without any changing of the system's underlying code or rule set. In FIG. 4C, a member or other user uses a user interface to add user properties 402 for various messages, such as a premium or VIP routing policy so that messages associated with VIP users are delivered via a VIP processing channel. This again allows a user to update rules for message delivery via a user interface simply by changing a parameter and creating an updated decision table 401*c*, without any changing of the system's underlying code or rule set.

The virtual space platform will associate users (including publishers and clients) with spaces. Such association may be referred to as membership in a space. When a user is associated with a space, the platform may generate an authentication token and issue the token to the user. Then, when the user is in communication with the platform, the platform may provide the user with platform access in response to the user presenting the authentication token. A user's membership in (i.e., association with) a space may remain as long as the space exists until the user or an authorized administrator deletes the user's membership. A user's membership in a space persists even during periods of time when the user is offline. Thus, the platform can manage access control without the publisher needing to build its own infrastructure for doing so.

The use of virtual spaces also allows the platform to track individual users' presence in a meaningful manner. Presence simply means that a member of a space is online and communicatively connected to the space so that the member may receive and/or send message via the space's channels. Rather than tracking whether a user is present in each of various channels, the system only needs to monitor whether the user is present in the virtual space. Space-level presence monitoring reduces the processing capacity required to monitor presence on all of the various individual channels that a virtual space may include. It also eliminates the requirement for the system to generate presence messages for each of the channels that make up a virtual space. Instead, if a member is present in (or absent from) the virtual space, the system may simply conclude that the present is present in (or absent from) each of the virtual space's channels. For example, if a particular member is not present in the space, the platform may hold some or all of the events and messages that are relevant to that member until the member again becomes present in the virtual space. When the member again becomes present in the virtual space (by returning to an active communicative connection with the space), the system may then dynamically map the user to the channels on which those members persist. For example, if the system determines that a particular member is not present in the virtual space (see, e.g., user 233 of FIG. 2), the system may hold all messages on all of channels of the space that are relevant to that member until the member returns to the virtual space or until a specified expiration period elapses, whichever occurs first.

The platform may associate each member of a space with one or more roles, each of which is associated with one or more permissions. This role-based access control therefore identifies, for example, what spaces a member may view, and what (if any) system administration tasks the member may implement (such as creating new users and assigning roles to the new users). Optionally, each space may include a default role for users who are not members of the space, or for new members who have not yet been assigned a different role.

Figure 5:
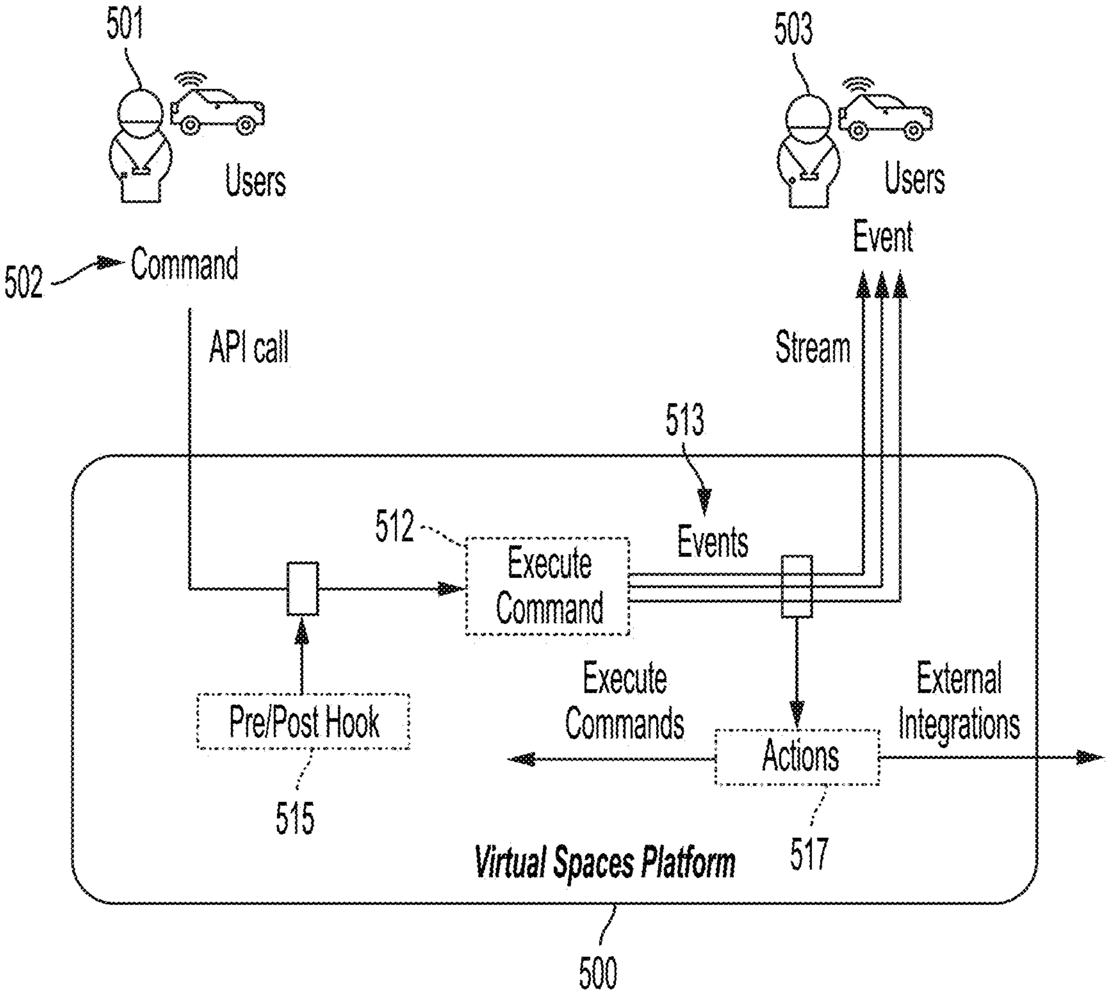
FIG. 5 illustrates a workflow of message processing via a virtual space platform.

FIG. 5 illustrates a process by which the platform 500 may further process events and messages. The concepts of "commands", "hooks", "events" (as described above), and "actions" are relevant to this discussion. A command 502 is a request (such as an API call) made by a client 501 to either change or retrieve the state of the system. Commands 502 are synchronous and have request parameters that trigger a response from the platform by execution 512 of the command. Some Commands are requests to change the state of the system (such as Create Space, or Delete User); others are requests to return the current state of the system (such as Get Users, or Get Spaces I'm a Member of). When the system executes 512 a command one or more events 513 may be generated.

A hook 515 is programming code received via a user interface through which users may write logic to either modify the request parameters of a command or modify a response (i.e., the events that the platform will generate when executing a command). For example, a user may submit, and the system may receive, a hook 515 on a send message command which passes the message to a moderation API that removes any profanity before the platform actually sends the message to other users 503 who are subscribers. As another example, for a get users command, the hook 515 may include logic to filter out certain users and not return information about those users to the requesting client 501. Example filters may include privacy permission controls, in which users who have not given the platform permission to share their information will not be returned to the requesting user who submitted the get user command.

As previously noted, events 513 represent changes to the platform. Events are sent asynchronously by services during the execution 512 of a command. Events 513 can be consumed in real time by users 503, trigger any actions 517 with which the events are associated, or be picked up by other internal services.

Actions 517 are custom bits of logic that users can bind to (i.e., associate with) an event 513 through various filters. When an event 513 is generated, any actions 517 bound to that event are triggered and the custom logic is executed.

Figure 6:
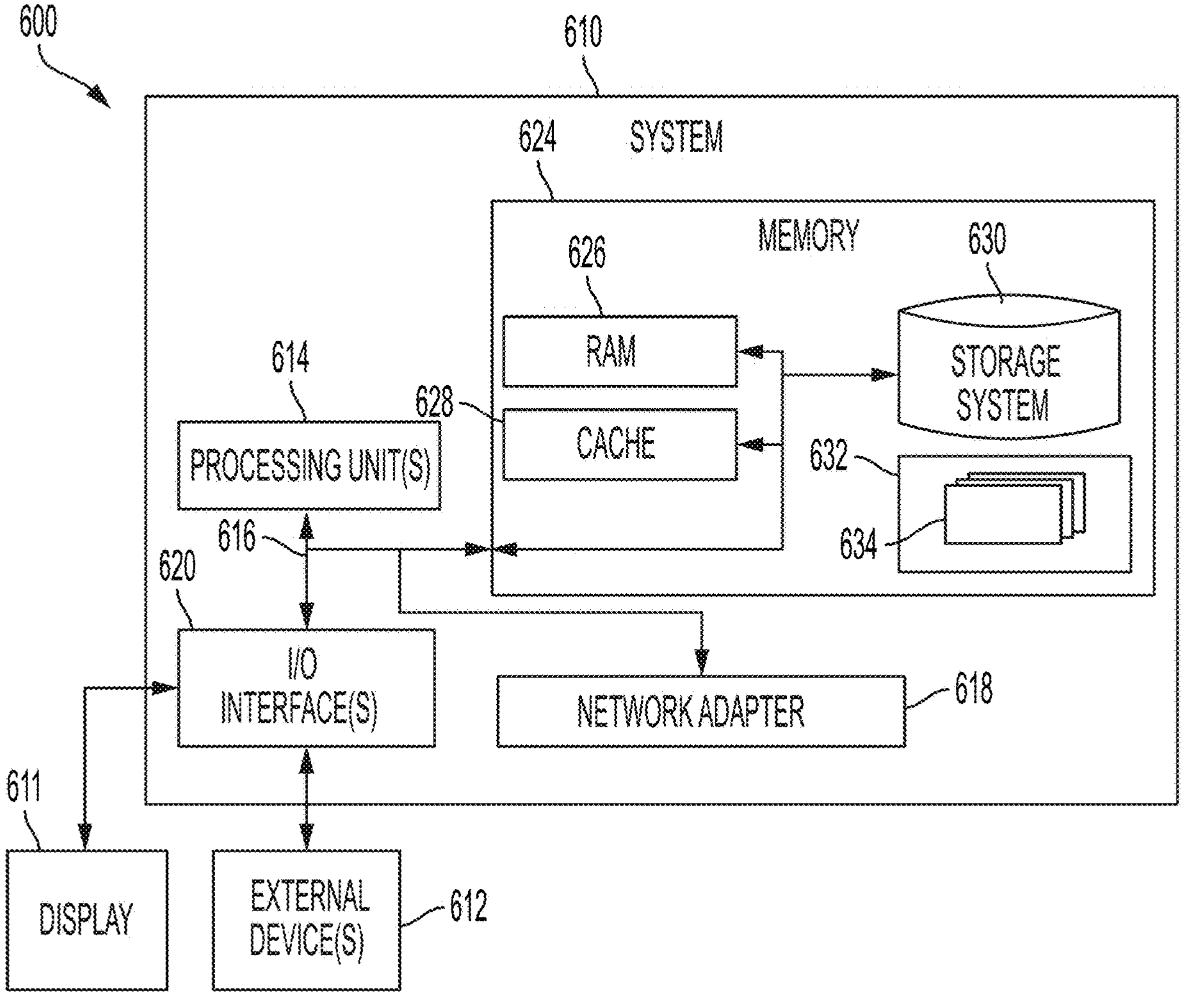
FIG. 6 illustrates example components of electronic devices that may be used with various aspects of the invention as described below.

FIG. 6 is a block diagram depicting various hardware components that may be part of a computing device of the platform's and/or of any publisher or subscriber client electronic device. For example, any of the devices shown in FIG. 1 may include similar internal hardware architecture such as that illustrated in FIG. 6. FIG. 6 provides only an illustration of one implementation and does not imply any limitations with regard to the environments in different embodiments that may be implemented. Many modifications to the depicted environment may be made.

In one or more cases, the devices in FIG. 1 are in the form of computing electronic devices, such as computer system 610. The components of the computer system 610 may include, but are not limited to, one or more processors or processing unit 614, a memory 624, and a bus 616 that couples various system components including the memory 624 to the processing unit 614. For example, each of the data centers shown in FIG. 1 may include a processing unit 614 and a memory 624 that contains programming instructions that are configured to cause the processing unit to perform various functions.

The bus 616 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system 610 typically includes a variety of computer system readable media. Such media may be any available media that is accessible by the computer system 610, and it includes both volatile and non-volatile media, removable and non-removable media.

The memory 624 can include computer system readable media in the form of volatile memory, such as random access memory (RAM) 626 and/or cache memory 628. The computer system 610 may further include other removable/non-removable, volatile/non-volatile computer system storage media. By way of example only, the storage system 630 can be provided for reading from and writing to a non-removable, non-volatile magnetic media (not shown, but examples are those typically called a hard drive or solid state drive). Although not shown, a magnetic disk drive for reading from and writing to a removable, non-volatile magnetic disk, and an optical disk drive for reading from or writing to a removable, non-volatile optical disk such as a CD-ROM, DVD-ROM, or other optical media can be provided. In such instances, each can be connected to the bus 616 by one or more data media interfaces. As will be further depicted and described below, the memory 624 may include at least one computer program product having a set (e.g., at least one) of program modules that are configured to carry out the functions of embodiments.

A program/utility 632, having one or more sets of program modules (i.e., programming instructions) 634, may be stored in the memory 624 by way of example, and not limitation, as well as an operating system, one or more application programs, other program modules, and program data. Each of the operating systems, one or more application programs, other program modules, and program data, or some combination thereof, may include an implementation of a networking environment. The program modules 634 generally carry out the functions and/or methodologies of embodiments as described in this document. The computer system 610 may also communicate with one or more external device(s) 612 such as a keyboard, a pointing device, a display 611, etc., or one or more devices that enable a user to interact with the computer system 610 and any devices (e.g., network card, modem, etc.) that enable the computer system 610 to communicate with one or more other computing devices. Such communication can occur via Input/Output (I/O) interface(s) 620. Still yet, the computer system 610 can communicate with one or more networks such as a local area network (LAN), a general wide area network (WAN), a cellular telephone data network, and/or a public network (e.g., the Internet) via a network adapter 618. As depicted, the network adapter 618 communicates with the other components of the computer system 610 via the bus 616. It should be understood that although not shown, other hardware and software components, such as microcode, device drivers, redundant processing units, external disk drive arrays, redundant array of independent disk (RAID) systems, tape drives, and data archival storage systems may be used in conjunction with the computer system 610.

The embodiments described in the present disclosure may relate to a system, a method, and/or a computer program product. The computer program product may include a computer readable storage medium (or media) having computer readable program instructions for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions, cloud storage, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described in this document can be downloaded to respective computing/processing devices from a non-transitory computer readable storage medium or to an external computer or external storage device via a network, for example, the Internet, a local area network, a wide area network, a cellular telephone data network, and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the embodiments may be instruction-set-architecture (ISA) instructions, machine instructions, machine dependent instructions, microcode, firmware instructions, state-setting data, or either source code or object code written in any combination of one or more programming languages, including an object oriented programming language such as C++ and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more cases, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments described in the present disclosure.

Aspects of the embodiments are described in this document with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by non-transitory computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

Terminology that is relevant to this disclosure includes:

In this document, when terms such "first" and "second" are used to modify a noun (such as a data center), such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the terms "connected" and "communicatively connected", when referring to two items that convey data between each other, means that a communication path exists between the two components. The path may be a direct path (such as a wired or wireless transmission) or an indirect path through one or more intermediary components such as intermediary networks.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server, virtual machine or container may be referred to simply as a "device" for brevity. Additional elements that may be included in electronic devices are discussed above in the context of FIG. 6.

The terms "processor," "processing unit" and "processing device" refer to a hardware component of an electronic device that is configured to execute programming instructions. Except where specifically stated otherwise, the singular terms "processor," "processing unit" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. A communication system is a system containing one or more computing devices, along with one or more communication devices such as wireless transmitters and/or receivers, wired communication ports, or other devices capable of transmitting and/or receiving digital signals.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of distributing messages to subscribers, the method comprising:

by a processor of a communication platform that manages the distribution of multiple channels, each of which comprises a data stream:

receiving a message;

analyzing the message and determining, based on one or more elements of the message, a message type for the message by:

determining that the message is of a publish type if the message is a message received from a publisher, and determining that the message is of a signal type if the message is an indicator of status of a publisher, a subscriber, or of another message;

selecting a quality of service that corresponds to the determined message type;

assigning the message to one or more of the channels; and transmitting the message to one or more subscribers via the one or more assigned channels according to the quality of service.

2. The method of claim 1, wherein:

the message does not identify the one or more channels to which the message will be assigned;

the message includes a SpaceID in the message, wherein the SpaceID is associated with a group of the channels; and assigning the message to one or more of the channels comprises selecting one or more of the channels from the group of channels that are associated with the SpaceID.

3. The method of claim 1, wherein transmitting the message to one or more subscribers to via the one or more assigned channels according to the quality of service comprises, in response to determining that a first delivery attempt has not delivered the message to one or more of the subscribers:

if the message is of the publish type, holding the message in a memory for a time period and attempting redelivery during the time period; and if the message is of the signal type, deleting the message after the first delivery attempt.

4. The method of claim 1, wherein transmitting the message to one or more subscribers according to the quality of service comprises:

if the message is of the publish type, saving the message to a memory for later distribution to subscribers who are currently offline, otherwise determining that the message is of the signal type and not saving the message to the memory for later delivery to the subscribers who are currently offline.

5. The method of claim 1, wherein assigning the message to one or more of the channels comprises:

accessing a decision table that associates user properties, message properties, and a plurality of the channels; and selecting, from the decision table, one or more channels for which the table indicates has:

associated message properties that correspond to one or more parameters of the message; and associated user properties that correspond to a publisher of the message or to the one or more subscribers.

6. The method of claim 5, wherein:

the decision table also associates qualities of service with each of the plurality of channels; and determining the quality of service for the message comprises selecting the quality of service that the table indicates corresponds to the selected one or more channels, the associated message properties, and the associated user properties.

7. The method of claim 1, wherein:

the message is associated with an event; and the method further comprises, by the processor, deleting a collection of channels with which the one or more channels are associated after the event has ended.

8. The method of claim 1 further comprising, in response to determining that a first subscriber of the one or more subscribers is not present in a collection of channels that includes the one or more to which the message is assigned, mapping the first subscriber to one or more of the one or more channels to which the message is assigned without any requirement of subscriber selection of the one or more channels.

9. The method of claim 1 further comprising, by the processor, assigning a first subscriber to a collection of channels with which the one or more channels are associated by:

generating an authentication token;

issuing the authentication token to the first subscriber; and when the first subscriber presents the authentication token to the platform, provide the first subscriber with access to the messages delivered via the collection of channels.

10. The method of claim 1, further comprising, by the processor:

assigning the message to a different channel; and dynamically mapping the one or more subscribers to the different channel so that the one or more subscribers receive the message via the different channel.

11. A message distribution system comprising:

a processor of a communication platform that manages the distribution of multiple channels, each of which comprises a data stream; and a memory device containing programming instructions that are configured to cause the processor to, upon receiving a message:

analyze the message and determining, based on one or more elements of the message, a message type for the message by:

determining that the message is of a publish type if the message is a message received from a publisher, and determining that the message is of a signal type if the message is an indicator of status of a publisher, a subscriber, or of another message;

select a quality of service that corresponds to the determined message type;

assign the message to one or more of the channels; and transmit the message to one or more subscribers via the one or more assigned channels according to the quality of service.

12. The system of claim 11, wherein:

the message does not identify the one or more channels to which the message will be assigned;

the message includes a SpaceID in the message, wherein the SpaceID is associated with a group of the channels; and the programming instructions to assign the message to one or more of the channels comprise instructions to select one or more of the channels from the group of channels that are associated with the SpaceID.

13. The system of claim 11, wherein the programming instructions to transmit the message to one or more subscribers to via the one or more assigned channels according to the quality of service comprise instructions to, in response to determining that a first delivery attempt has not delivered the message to one or more of the subscribers:

if the message is of the publish type, hold the message in a memory for a time period and attempting redelivery during the time period; and if the message is of the signal type, delete the message after the first delivery attempt.

14. The system of claim 11, wherein the programming instructions to transmit the message to one or more subscribers according to the quality of service comprise instructions to:

if the message is of the publish type, save the message to a memory for later distribution to subscribers who are currently offline, otherwise determine that the message is of the signal type and not save the message to the memory for later delivery to the subscribers who are currently offline.

15. The system of claim 11, wherein the instructions to assign the message to one or more of the channels comprise instructions to:

access a decision table that associates user properties, message properties, and a plurality of the channels; and select, from the decision table, one or more channels for which the table indicates has:

associated message properties that correspond to one or more parameters of the message; and associated user properties that correspond to a publisher of the message or to the one or more subscribers.

16. The system of claim 15, wherein:

the decision table also associates qualities of service with each of the plurality of channels; and the instructions to determine the quality of service for the message comprise instructions to select the quality of service that the table indicates corresponds to the selected one or more channels, the associated message properties, and the associated user properties.

17. The system of claim 11, wherein:

the message is associated with an event; and the programming instructions method further comprise instructions to delete a collection of channels with which the one or more channels are associated after the event has ended.

18. The system of claim 11, further comprising additional programming instructions to, in response to determining that a first subscriber of the one or more subscribers is not present in a collection of channels that includes the one or more channels to which the message is assigned, map the first subscriber to one or more of the one or more channels to which the message is assigned without any requirement of subscriber selection of the one or more channels.

19. The system of claim 11, further comprising additional programming instructions to assign a first subscriber to a collection of channels with which the one or more channels are associated by:

generating an authentication token;

issuing the authentication token to the first subscriber; and when the first subscriber presents the authentication token to the platform, provide the first subscriber with access to the messages delivered via the collection of channels.

20. The system of claim 11, further comprising additional programming instructions to:

assign the message to a different channel; and dynamically map the one or more subscribers to the different channel so that the one or more subscribers receive the message via the different channel.

* * * * *